United States Patent
Kay

(10) Patent No.: US 6,173,984 B1
(45) Date of Patent: Jan. 16, 2001

(54) TRAILER HITCH

(75) Inventor: Jon D. Kay, Maple Valley, WA (US)

(73) Assignees: Jack Kay; Anthony Kay, both of Kent, WA (US)

(*) Notice: Under 35 U.S.C. 154(b), the term of this patent shall be extended for 0 days.

(21) Appl. No.: 09/329,961

(22) Filed: Jun. 9, 1999

(51) Int. Cl.[7] .................................................. B60D 1/58
(52) U.S. Cl. ........................ 280/495; 280/504; 280/491.5
(58) Field of Search .................. 280/504, 477, 280/478.1, 482, 491.1, 491.5, 495, 497, 500, 507; 248/316.8

(56) References Cited

U.S. PATENT DOCUMENTS

| | | | |
|---|---|---|---|
| 2,176,878 | 10/1939 | Arehart | 280/33.44 |
| 2,320,046 | 5/1943 | Notar | 280/33.44 |
| 2,554,711 | 5/1951 | Lowman | 280/33.44 |
| 3,428,336 | 2/1969 | Thurman | 280/482 |
| 3,462,173 | 8/1969 | Bock | 280/484 |
| 3,490,788 | 1/1970 | Mann | 280/406 |
| 3,578,358 | 5/1971 | Reynolds | 280/500 |
| 3,730,556 | 5/1973 | Aldape et al. | 280/500 |
| 3,768,837 | 10/1973 | Reese | 280/495 |
| 4,050,714 | 9/1977 | Epp | 280/495 |
| 4,202,562 | 5/1980 | Sorenson | 280/415 R |
| 4,398,743 | 8/1983 | Belsky et al. | 280/495 |
| 4,761,015 | 8/1988 | Carr | 280/402 |
| 5,011,177 | 4/1991 | Grice | 280/482 |
| 5,217,242 | 6/1993 | Thomas | 280/482 |
| 5,476,279 | 12/1995 | Klemetsen | 280/415.1 |
| 5,511,813 | 4/1996 | Kravitz | 280/495 |
| 5,593,171 | 1/1997 | Shields | 280/479.2 |
| 5,620,198 | * 4/1997 | Borchers | 280/507 |
| 5,630,606 | 5/1997 | Ryan | 280/479.3 |
| 5,725,231 | 3/1998 | Buie | 280/455.1 |
| 5,727,805 | 3/1998 | La Roque | 280/478.1 |
| 5,873,594 | * 2/1999 | McCoy et al. | 280/491.5 |
| 5,884,930 | * 3/1999 | Cluth | 280/497 |

FOREIGN PATENT DOCUMENTS

| | | | |
|---|---|---|---|
| 4115812 | * 11/1991 | (DE) | . |
| 2513576 | 4/1983 | (FR) | B60D/1/06 |
| WO 94/19205 | 9/1994 | (WO) | B60D/1/52 |

* cited by examiner

Primary Examiner—Brian L. Johnson
Assistant Examiner—Avraham H. Lerner
(74) Attorney, Agent, or Firm—R. Reams Goodloe, Jr.

(57) ABSTRACT

A high strength hitch. The hitch is affixed to the rear of a towing vehicle. The apparatus includes a frame having a transversely extending tubular structural member extending between a first end and a second end and having a front, a rear, a bottom, and a top. A rearwardly extending first tubular receiving member is provided with its forward end affixed to the rear of the transverse tubular structural member. A second tubular receiving member is provided mounted below the first tubular receiving member. An upper forward portion of the second tubular receiving member is affixed below the transverse structural member. A strengthing bottom plate is provided below and affixed to the second tubular receiving member. The bottom plate also has an upwardly extending forward portion which is affixed to the front of the transverse structural member. A pair of opposing frame mounts are provided, one affixed proximate a first end of the transverse structural member, and the second one affixed proximate the second end of the transverse structural member. The frame mounts are the sole attachment members for affixing the hitch to a vehicle. Dual tubular tow bar inserts are provided, structurally joined, for increasing the tow bar strength. A conventional hitch is attached to the upper tubular tow bar receiver.

16 Claims, 7 Drawing Sheets

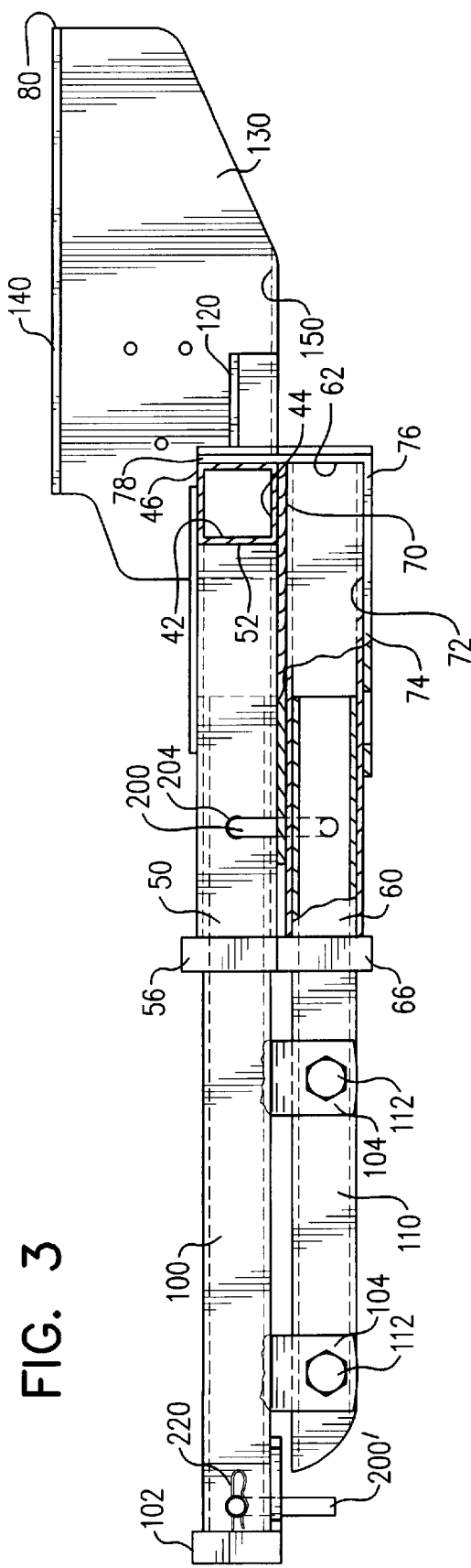
FIG. 3
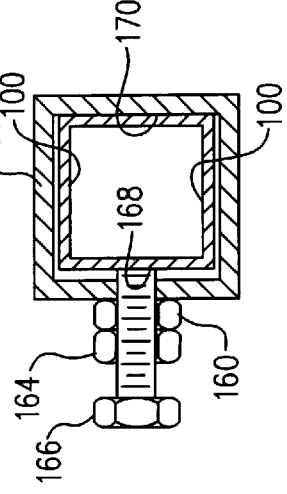
FIG. 4
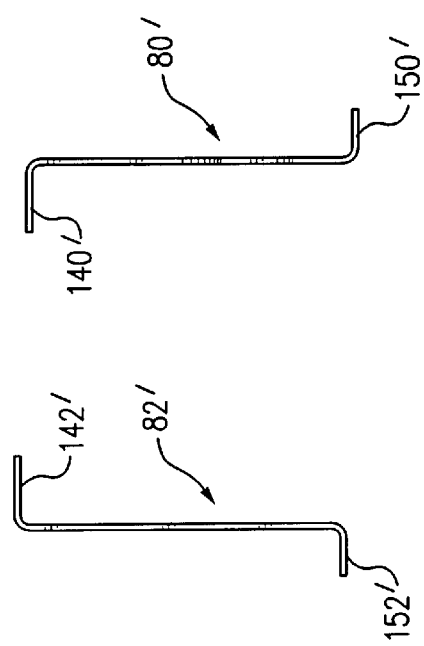
FIG. 10
FIG. 11

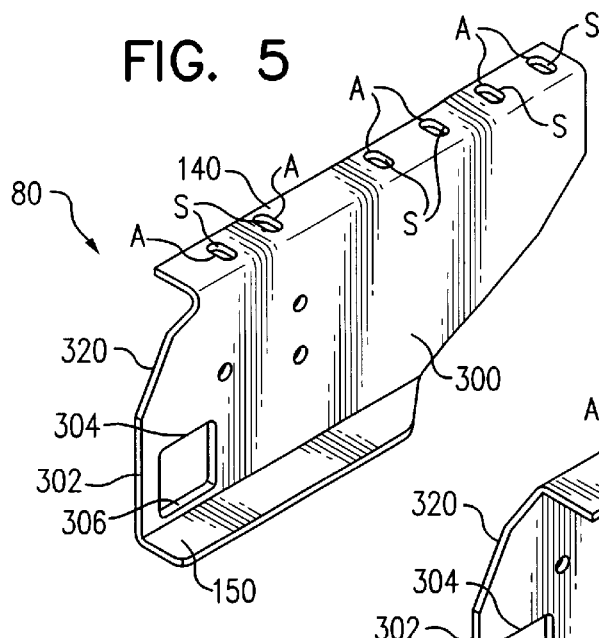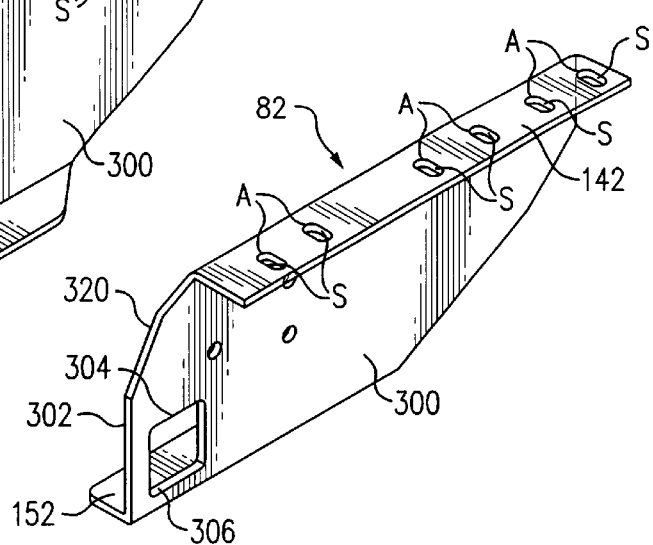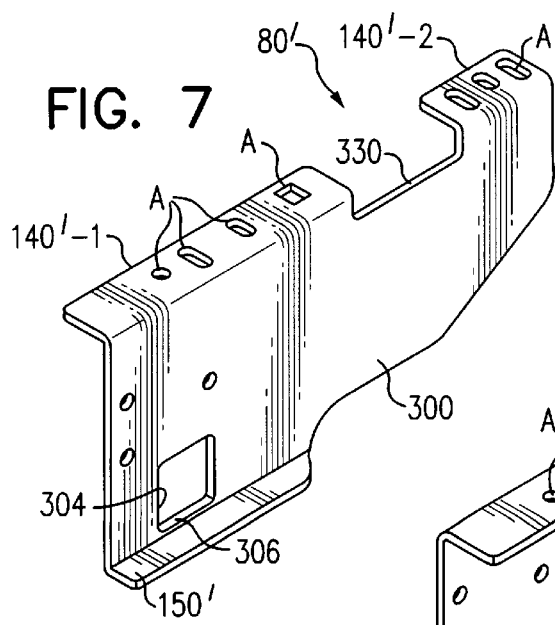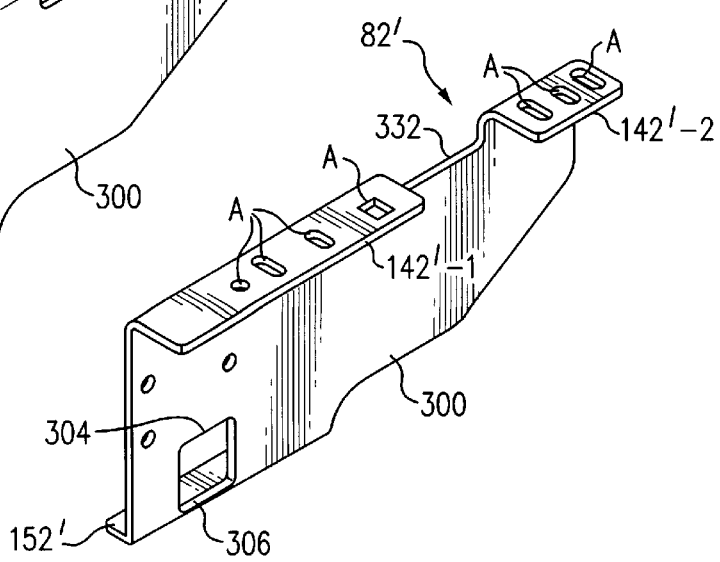

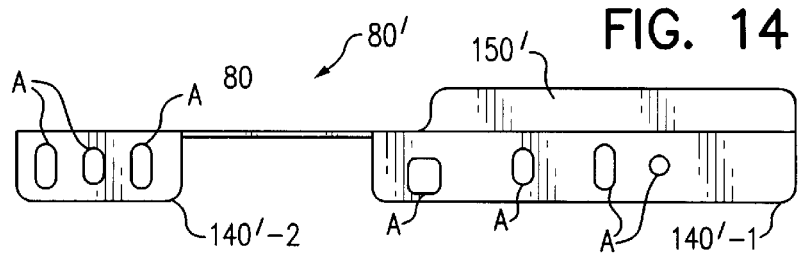
FIG. 14
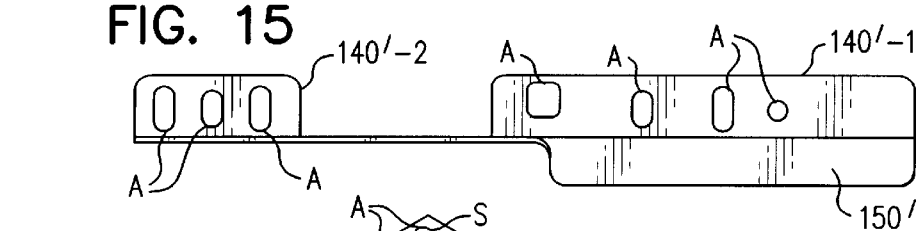
FIG. 15
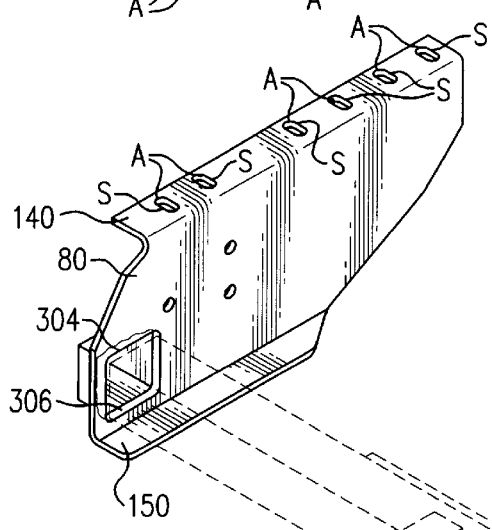
FIG. 16
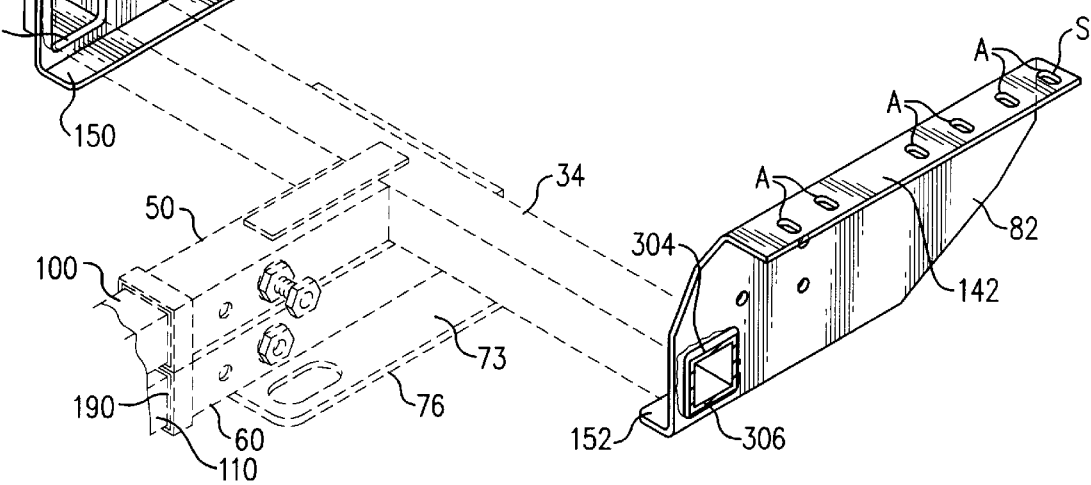
FIG. 17
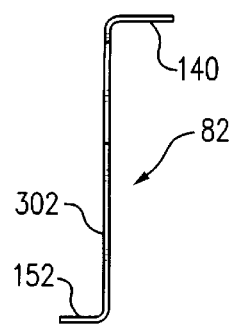
FIG. 18
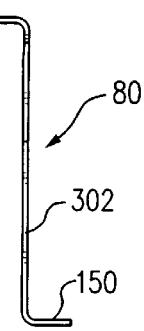

TRAILER HITCH

FIELD OF THE INVENTION

My invention relates to a hitch for installation on a towing vehicle, and more particularly to a novel, improved tubular hitch apparatus which may be attached to a vehicle.

BACKGROUND

It is often desirable to tow trailers, such as boat trailers, horse trailers, utility trailers, or other equipment, behind a motor vehicle. Typically, a pickup truck on which a reawardly extending camper has been installed is utilized as the towing vehicle. In such situations, the extension of the camper beyond the bumper location of the vehicle is problematic for installation of a hitch. Typically, towing hitches that have been employed in such applications have been designed so that attachment between the hitch and the bumper, or between the hitch and the camper, has been necessary. However, the cost of such trailer hitches, and the additional complexity in hooking up such hitches, adds undesirably to the cost and complexity of providing hitches to consumers, particularly when the vehicle cannot be easily examined. Consequently, it has been impossible to provide such prior art hitches via mail order.

I am aware of various attempts in which an effort has been made to provide an improved towing hitch. Most hitches previously employed for such applications have been relatively weak with respect to resistance to lateral movement, and with respect maximum hitch loading. Or, in designs which have attempted to provide resistance to lateral movement, such as is shown by Sorensen in U.S. Pat. No. 4,202,562, issued May 13, 1980 for a Trailer Hitch, the necessity for and extra costs of the attachment of struts or support bars arises. Consequently, prior art hitches have considerable shortcomings since they require various fastening devices, or the use of repositioning and latching or various other adjustable parts. Thus, the advantages of my simple, high strength dual tubular tow bar insert design, and the avoidance of lateral struts, or mounting brackets, are important and self-evident.

OBJECTS, ADVANTAGES, AND NOVEL FEATURES

I have now invented, and disclose herein, an improved design for trailer hitch which does not have the above-discussed drawbacks common to those somewhat similar products heretofore designed or used of which I am aware. Unlike the earlier designs which had attempted to provide strengthening struts and attachment parts to stabilize and control use forces in the hitch design, my hitch is adaptable to being affixed at the rear of a towing vehicle with a simple pair of mounting frame brackets, without resort to various struts or other attachment parts. Further, it is simple, relatively inexpensive and easy to manufacture, and otherwise superior to those designs heretofore used or proposed. In addition, it provides a significant, additional measure of safety for a towing hitch, due to its relatively high strength structural design.

From the foregoing, it will be apparent to the reader that one important and primary object of the present invention resides in the provision of a novel trailer hitch apparatus which simplifies the installation of the hitch, and which improves the simplicity and safety of towing, eliminating reliance on extraneous attachable struts, brackets, or other parts.

Other important but more specific objects of the invention reside in the provision of a trailer hitch as described herein which:

- can be manufactured in a simple, straightforward manner of commonly available materials;
- in conjunction with the preceding object, have the advantage that it can be easily and quickly installed by a user, unlike most if not all somewhat similar conventional trailer hitches;
- which in a relatively inexpensive manner can enhance safety in towing.

Other important objects, features, and additional advantages of my invention will become apparent to the reader from the foregoing and the appended claims and as the ensuing detailed description and discussion proceeds in conjunction with the accompanying drawing.

SUMMARY OF THE INVENTION

I have now invented and disclose herein a novel trailer hitch design. The apparatus is especially useful for towing trailers behind vehicles having campers with an extended overhang, without the necessity of providing various staybars, struts, or hanger brackets, or other extension devices as have been utilized previously. My trailer hitch includes a main frame having a transversely extending tubular structural member. The transverse structural member extends between a first end and a second end (left end and right end), and, using the same orientation for reference as would be used in a towing vehicle, has a front, a rear, a bottom, and a top. A first tubular receiving member is provided having a forward end affixed to the rear of the transversely extending tubular structural member. The first tubular receiving member extends rearwardly along a central axis to a first mouth portion. A second tubular receiving member is mounted below the first tubular receiving member. The second tubular receiving member has a forward end, and extends rearwardly along a central axis to a second mouth portion. The second tubular member also has an upper forward portion which is affixed to the bottom of the transversely extending tubular structural member. A structurally strengthening bottom plate is provided to strengthen the joint between the second tubular receiving member and the transverse tubular structural member. The bottom plate has a base portion with an upper surface, and an upwardly extending forward portion. The upwardly extending forward portion of the bottom plate is affixed to the front of the transverse structural member, as well as to the forward end of the second tubular hitch receiver. A pair of opposing frame mounts are provided to attach the hitch to a towing vehicle. One of the frame mounts is affixed proximate to the first end of the transverse structural member, and another one of the frame mounts is affixed proximate the second end of the transverse structural member. This high strength frame mounts and hitch frame can be utilized as the sole attachment structure affixing the hitch to a vehicle. A first tubular tow bar insert and a second tubular tow bar insert are provided. The first tubular tow bar insert is removeably engageable and snugly interfitting for sliding insertion into said first tubular receiving member. The first tubular tow bar insert further includes a rearwardly extending hitch receiving portion. To join the first and second tubular tow bar inserts, at least two downwardly extending generally U-shaped mounting brackets are provided. The downwardly extending mounting brackets are laterally straddling the second tubular tow bar insert, and fasteners are utilized to securely affix the second tubular tow bar insert to the first tubular tow bar insert to provide a unitary, singularly acting structural member. For additional strength, a pair of stiffening angle gussets are provided. One of the stiffening angle gussets is affixed proximate the first end of the transverse structural member between a first one of the frame mounts and the transverse structural member. A second one of the stiffening angle gussets is affixed proximate the second end of the transverse structural member between a second one of the frame mounts and the transverse structural member, so as to strengthen the overall structure said frame.

My novel trailer hitch provides a simple, secure device for towing trailers behind trucks having extended campers thereon. The design provides a significant improvement by reducing complexity and installation details when compared to previous designs known to me for such trailer hitches.

BRIEF DESCRIPTION OF DRAWING

FIG. 2A shows the insert end of a tubular tow bar, and indicates the horizontally opposed apertures which are provided for use with a locking pin.

FIG. 3 is a side view of my new trailer hitch as just shown in FIG. 2 above, now showing the use of downwardly affixed U-shaped brackets for structurally combining a first and a second tow bar, as well as strengthening gussets between the transverse mount and the frame.

FIG. 4. is a vertical cross-sectional view, taken across a partial section of FIG. 2, showing the use of a bolt to frictionally engage the first tubular receiving member with the first tubular tow bar insert, to secure the first tubular tow bar insert against movement.

FIG. 5 is a perspective view of one embodiment of a left frame mount, showing an upper mounting flange portion, a plurality of pre-drilled mounting apertures, and a lower strengthening flange portion.

FIG. 6 is a perspective view of a right frame mount, similar to, and preferably the mirror image of, the embodiment just shown in FIG. 5 above.

FIG. 7 is a perspective view of a second embodiment of a left frame mount, showing an upper mounting flange portion with first and second mounting flange elements, a plurality of pre-drilled mounting apertures, and a lower strengthening flange portion.

FIG. 8 is a perspective view of right frame mount, similar to, and preferably the mirror image of, the left frame mount just illustrated in FIG. 7.

FIGS. 10 and 11 are rear views of the left and right frame mounts, respectively.

FIG. 14 is a top view of the second embodiment of my left frame mount.

FIG. 15 is a bottom view of the second embodiment of my left frame mount.

FIG. 16 is a perspective view of the the first embodiment of my frame mounts, showing the left and right frame mounts first depicted in FIG. 5 and FIG. 6 above, respectively.

FIG. 17 is an end view of the first embodiment of my frame mount showing a right frame mount.

FIG. 18 is an end view of the first embodiment of my frame mount, showing a left frame mount.

In the various figures, like structures may be shown with identical reference numbers, without further discussion thereof.

DESCRIPTION

Figure 2:
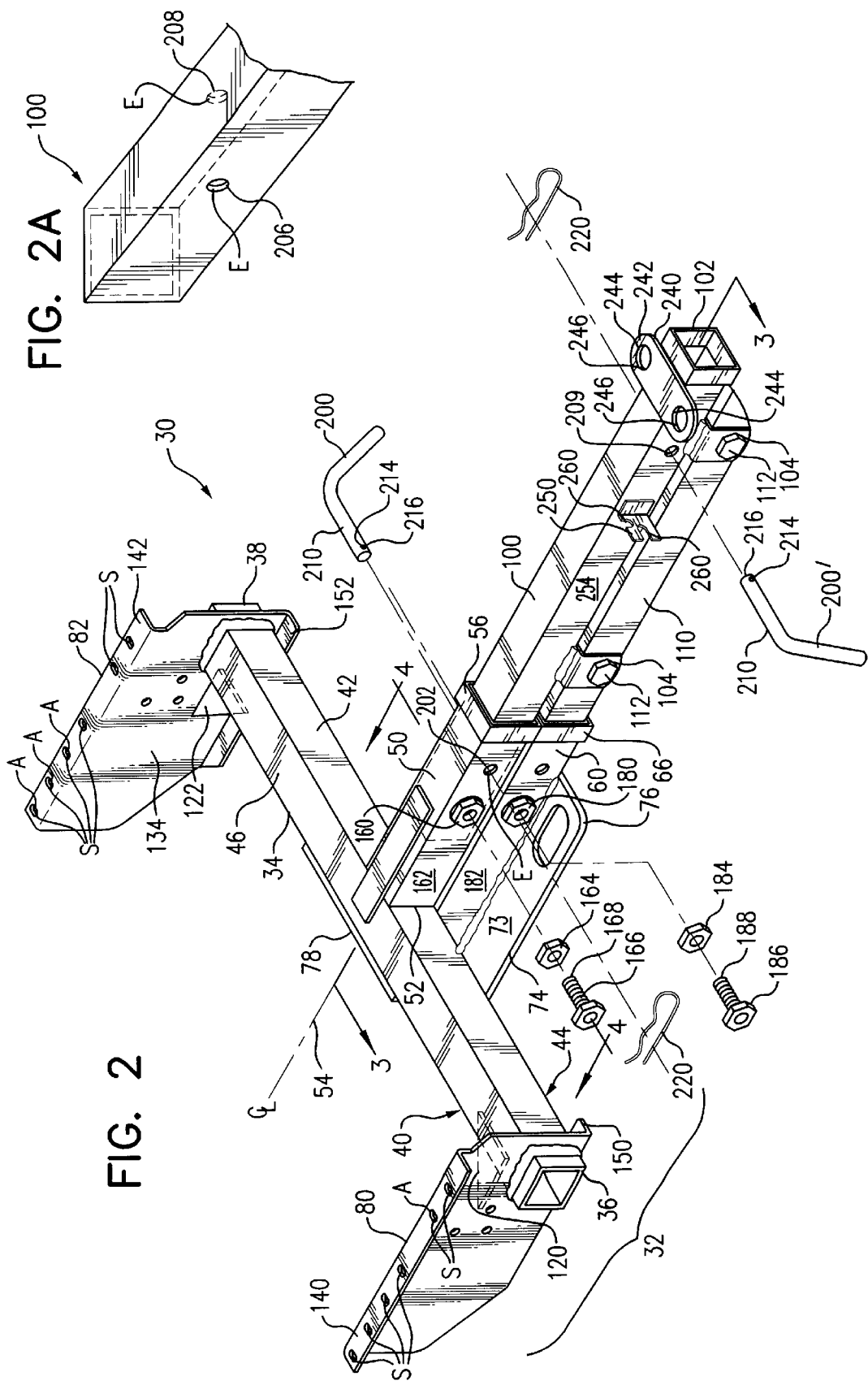
FIG. 2 is a perspective view of my new trailer hitch, showing the strengthened frame, the redesigned outwardly oriented and pre-drilled mounting flanges, and an added wiring harness clip, as well as the removal of an attachment bracket for affixing the hitch to an overhanging camper.
Figure 9:
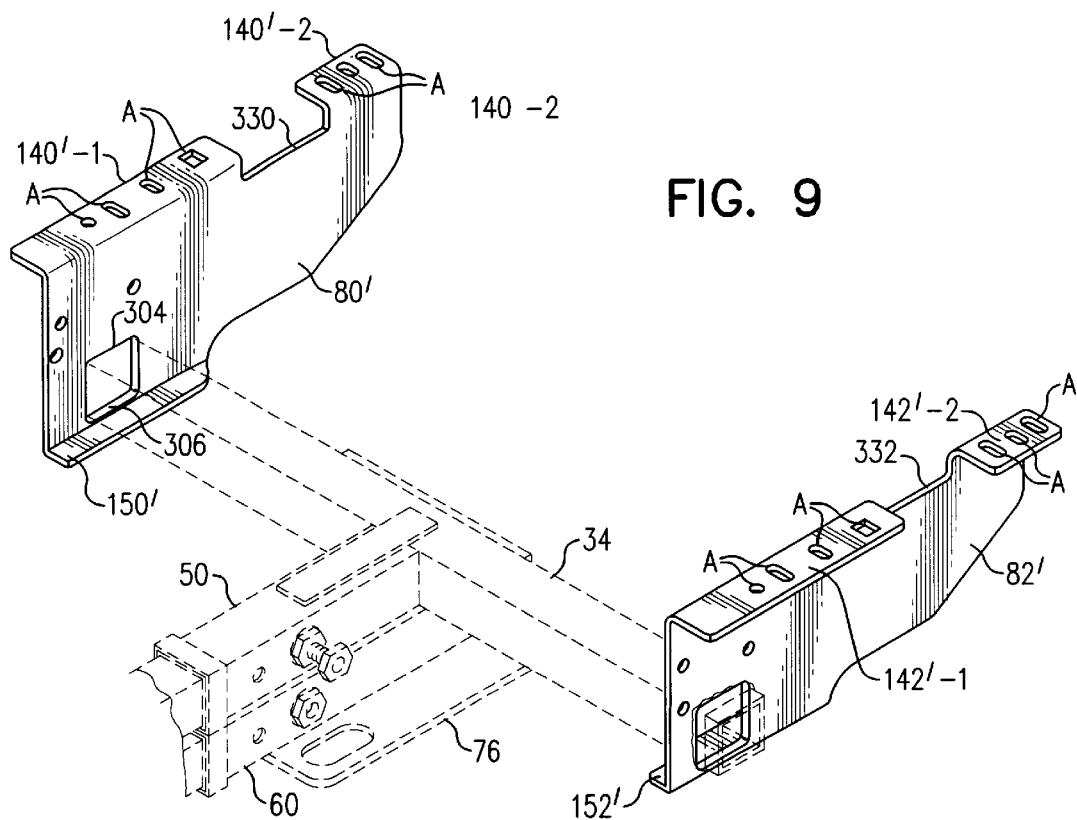
FIG. 9 is a perspective view of the second embodiment of my right and left frame mounts affixed in position in a finished trailer hitch, the remainder of which is shown in hidden lines.
Figure 12:
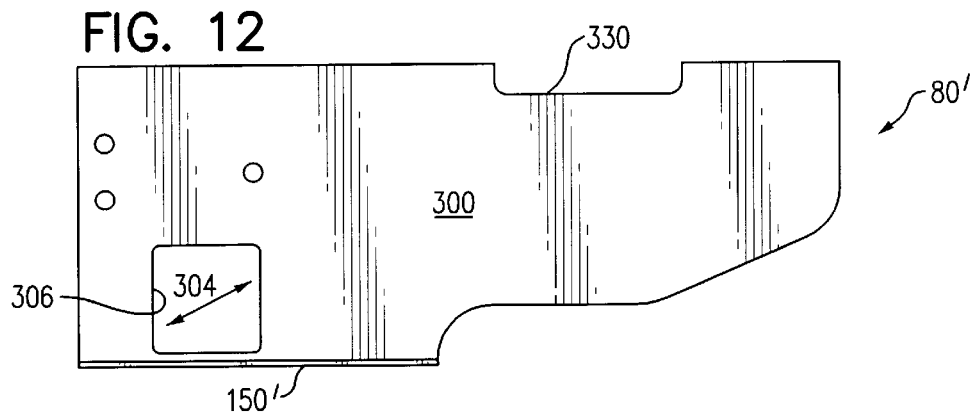
FIG. 12 is a left side view of the second embodiment of my left frame mount.
Figure 13:
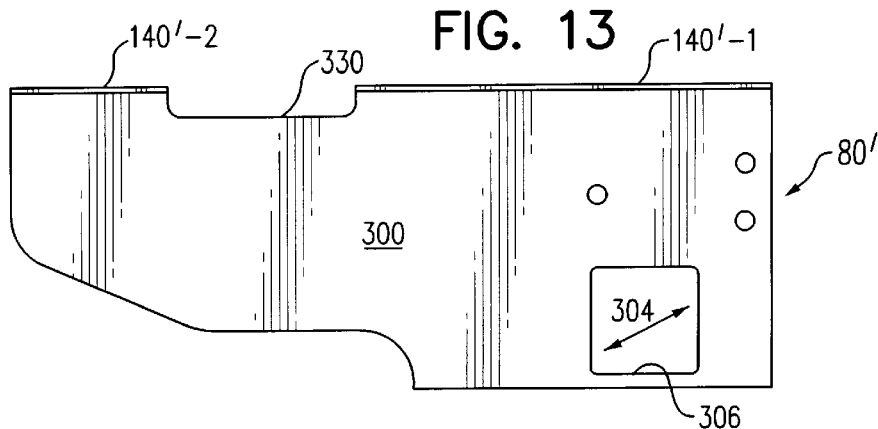
FIG. 13 is a right side view of the second embodiment of my left frame mount.

Attention is directed to FIG. 2 of the drawing, where my newest high strength towing hitch 30 is illustrated, ready for attachment to a towing vehicle (not shown). A frame 32 includes a transversely extending tubular structural member 34, preferably square tubular in shape, which extends between a first end 36 and a second end 38. The tubular structural member has a front 40, a rear 42, a bottom 44, and a top 46. A first tubular receiving member 50 is provided as a part of frame 32. The first tubular receiving member 50 has a forward end 52 affixed to the rear 42 of the transversely extending tubular structural member 34. The first tubular receiving member 50 extends rearwardly along a central axis centerline 54 to a first mouth portion 56. A second tubular receiving member 60 is mounted below the first tubular receiving member 50. The second tubular receiving member 60 has a forward end 62 (see FIG. 3), and extends rearwardly along central axis centerline 54 to a second mouth portion 66. The second tubular receiving member 60 has an upper forward portion 70 which is affixed to the bottom 44 of the transversely extending tubular structural member 34. The second tubular receiving member 60 also has a bottom portion 72 which is affixed to the upper surface 73 of the base portion 74 of bottom plate 76. The bottom plate 76 is preferably provided in an L-shape, with the upwardly extending forward portion 78 affixed to the front 40 of the transversely extending structural member 34 and to the second tubular receiving member 60 for providing high strength and lateral resistance to movement. Also, a strengthening strap 79 is provided, preferably in thin parallelepiped shape, to secure the upper surface 46 of the transverse structural member 34 to the first tubular receiving member 50. Most preferably, the various frame 32 components are welded together to provide a high strength frame 32.

At least two, and preferably a pair of frame mounts 80 and 82 are provided. Specifically, a left frame mount 80 and a right frame mount 82 form a pair of opposing frame mounts for affixing the hitch 30 to a towing vehicle. The left one 80 of the pair of frame mounts is affixed proximate the first end 36 of the transverse structural member 34. The right one 82 of the pair of frame mounts is affixed proximate the second end 38 of the transverse structural member 34. Ideally in my high strength hitch 30, the frame mounts 80 and 82 are the sole attachment structure for affixing the hitch 30 to a towing vehicle. For specific details of frame mounts, refer to the discussion below.

A first tubular tow bar insert 100 is removeably engageable and snugly interfitting for sliding insertion into the first tubular receiving member 50. The first tubular tow bar insert 100 also has a rearwardly extending hitch receiving portion 102. At least two downwardly extending generally U-shaped mounting 104 are utilized to straddle a second tubular tow bar insert 110, to securely affix via use of fasteners 112 (such as nuts and bolts) the second tubular tow bar insert 110 to the first tubular tow bar insert 100, so as to join the first 100 and second 110 tubular tow bar inserts into a singularly acting high strength structure. The second tubular tow bar insert 110 is removeably engageable and snugly interfitting for sliding insertion into the second tubular receiving member 6o.

Figure 1:
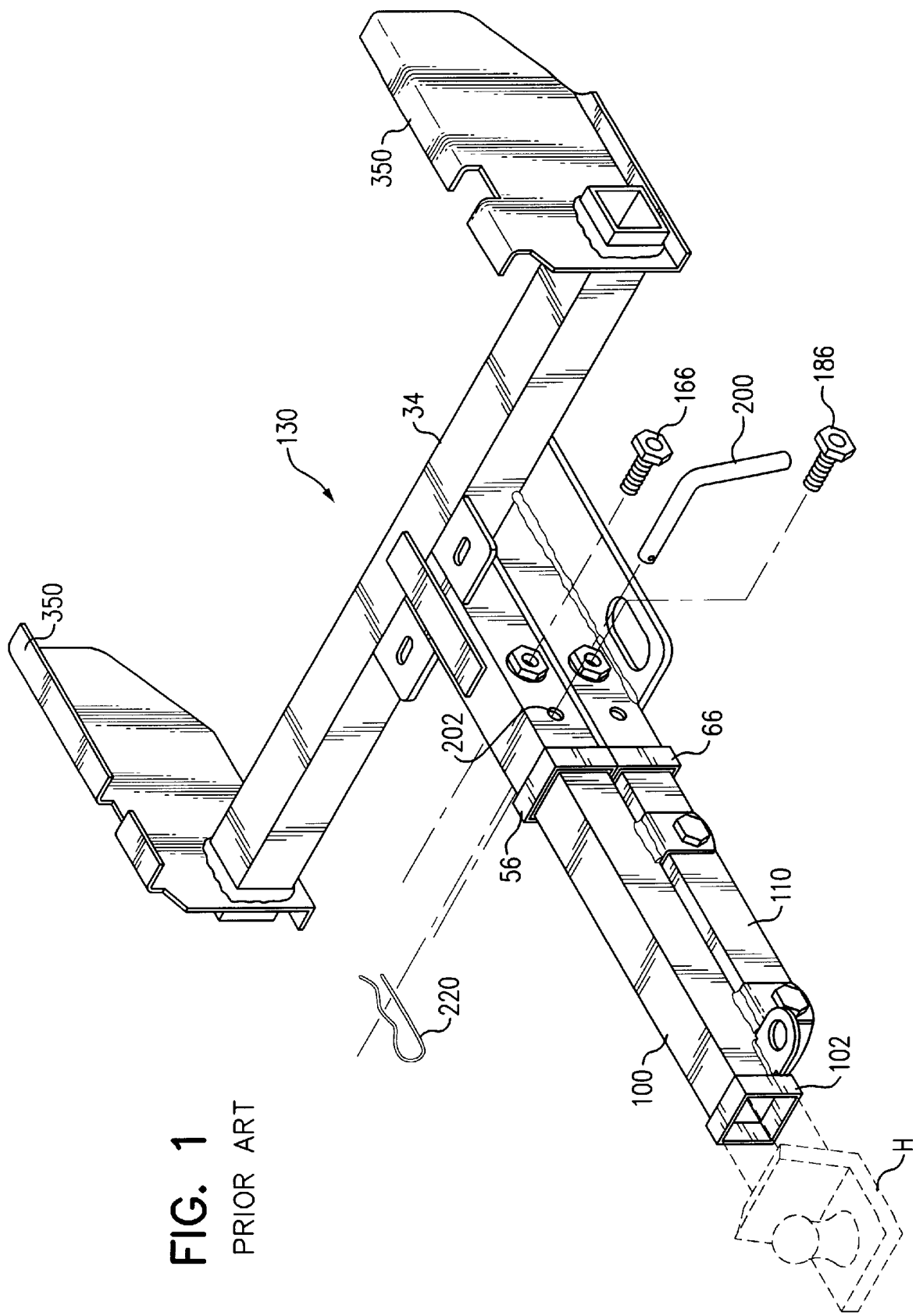
FIG. 1 is a perspective view of a prior art hitch which I designed, showing an old style attachment flange which required drilling of holes for placement of attachment bolts, as well as an attachment plate utilized for stabilizing such hitch with respect to an overhanging camper insert.

My improved high strength hitch 30 also utilizes a pair of stiffening angle gussets 120 and 122, to improve the structural strength against lateral resistance over one of my prior art hitches 130 as set forth in FIG. 1. Preferably, a first one 120 of the stiffening angle gussets is affixed proximate the first end 36 of the transverse structural member 34, between the inside 132 of a first one 80 of the pair of frame mounts and the transverse structural member 34. A second one 122 of pair of stiffening angle gussets is affixed proximate the second end 38 of the transverse structural member 34, between the inside 134 of a second one 82 of the pair of frame mounts and the transverse structural member 34. In this way, the frame structure 32 of hitch 30 is stiffened against bending moment forces and against forward forces, such as might be experienced during a collision of an object with the rear of a towing vehicle.

For easy attachment to a vehicle frame, the frame mounts 80 and 82 preferably include an upper mounting flange portion, designated 140 and 142, respectively. I have found that for ease of assembly, it is preferably that the upper mounting flange portions 140 and 142 be outwardly directed to the left and right, respectively, toward the first 36 and second 38 ends of the transverse structural member 34, respectively. Ideally, each of mounting flange portions 140 and 142 include a plurality of pre-drilled mounting apertures A, each of which is defined by sidewall portions S.

For additional strength against bending and twisting forces, I have found it advantageous to also provide a lower flange portion 150 and 152 on frame mounts 80 and 82, respectively. Preferably, the lower flange portion 150 and 152 is inwardly oriented, toward the centerline 54 and away from the first and second ends of the transverse structural member. In any case, flanges 150 and 152 are preferably oriented opposite the direction of the companion upper mounting flange portion 140 or 142 on that frame mount 80 or 82, respectively.

As better seen by comparing FIGS. 2 and 4, in order to completely secure the first and second tow bar inserts 100 and 110 in the first and second tubular receiving members 50 and 60, respectively, I have found it advantageous to provide a tightening bolt assembly. This assembly includes a first nut 160 securely affixed to a first side 162 of the first tubular receiving member 50, a first locking nut 164, and a first fastening bolt 166 having a distal end 168. The fastening bolt 166 is adapted for tightening in the first nut 160 until the distal end 168 urges the first tubular tow bar insert 100 toward the opposing inner wall 170 of the first tubular receiving member 50, for frictional engagement therewith, so that the first tubular tow bar 100 is secured, so as to resist movement. When the fastening bolt 166 is in place, then first locking nut 164 is utilized to lock the bolt 166 in place, by frictionally engaging locking nut 164 against first nut 160.

As better seen by comparing FIGS. 2 and 4, in order to completely secure the first and second tow bar inserts 100 and 110 in the first and second tubular receiving members 50 and 60, respectively, I have found it advantageous to provide a tightening bolt assembly. This assembly includes a first nut 160 securely affixed to a first side 162 of the first tubular receiving member 50, a first locking nut 164, and a first fastening bolt 166 having a distal end 168. The fastening bolt 166 is adapted for tightening in the first nut 160 until the distal end 168 urges the first tubular tow bar insert 100 toward the opposing inner wall 170 of the first tubular receiving member 50, for frictional engagement therewith, so that the first tubular tow bar 100 is secured, so as to resist movement. When the fastening bolt 166 is in place, then first locking nut 164 is utilized to lock the bolt 166 in place, by frictionally engaging locking nut 164 against first nut 160.

Similarly, with respect to securing the second tow bar 110 in the second tubular receiving member 60, a second mounting bolt assembly is provided. This second assembly includes a second nut 180 securely affixed to a first side 182 of the second tubular receiving member 60, a second locking nut 184, and a second fastening bolt 186 having a distal end 188. The second fastening bolt 186 is adapted for tightening in the second nut 180 until the distal end 188 urges the second tubular tow bar insert 110 toward the opposing inner wall 190 of the second tubular receiving member 60, for frictional engagement therewith, so that the second tubular tow bar 110 is secured, so as to resist movement. When the fastening bolt 186 is in place, then second locking nut 184 is utilized to lock the bolt 186 in place, by frictionally engaging locking nut 184 against second nut 180.

For further securing the tow bar inserts 100 and 110, a conventional, generally L-shaped locking pin 200 is provided. In order to utilize the locking pin 200, the first tubular receiving member 50 further includes a pair of horizontally spaced apart first and second sidewall apertures 202 and 204, each of which are defined by edgewall portions E. Similarly, as seen in FIG. 2A, the first tubular tow bar 100 has a companion pair of horizontally spaced apart third 206 and fourth 208 sidewall apertures, and each of the third 206 and fourth 208 sidewall apertures are also defined by edgewall portions E. The first 202, second 204, third 206, and fourth 208 sidewall apertures are of comparable size and adapted for alignment to receive therethrough in close fitting engagement the generally L-shaped locking pin 200, so as to lock the first tubular tow bar 100 to the first tubular receiving member 50 against forward or rearward movement along the axis of insertion of the first tubular tow bar 100 into the first tubular receiving member 50. In addition to the locking pin just described, a similar locking pin 200' is provided for use in affixing a selected hitch H (not shown, but same as shown in hidden lines in FIG. 1) to the mouth 102 of the first tow tubular tow bar 100. In that arrangement, the first tubular tow bar 100 has fifth and sixth sidewall apertures, each of said fifth 209 and sixth (not shown) sidewall apertures defined by edgewall portions, and a selected hitch insert has complementary horizontally spaced apart seventh and eighth sidewall apertures defined by edgewall portions, and all of the fifth, sixth, seventh, and eighth sidewall apertures are of comparable size and are adapted for receiving the second generally L-shaped locking pin 200' in a pre-selected locking location, so that the selected hitch insert is locked to the first tubular tow bar 100.

To secure the locking pin 200 or 200', either of such locking pins utilize a cylindrical main body 210 having a longitudinal axis. Proximate to the distal end 212 of the main body 210, the locking pin has a securing pin aperture 214 defined by an interior sidewall 216. The securing pin sidewall 216 is preferably oriented transverse to the longitudinal axis of the cylindrical main body 210. A securing pin 220 is provided which is adapted for secure engagement through the aperture 214 and against the cylindrical main body 210, so as to secure the locking pin against disengagement from a pre-selected locking location.

In the embodiment shown in FIG. 2, I have also provided an upper chain attachment plate 240. The chain attachment plate 240 has an elongated main body with spaced apart chain receiving apertures 242 defined by vertically oriented sidewall portions 244. Preferably, the inner sides 246 of the chain receiving apertures 242 are spread laterally outwardly beyond the first tubular tow bar 110.

I have also found it useful to provide a plug bracket 250, for affixing electrical lines and plugs between the towed trailer and the towing vehicle. The plug bracket 250 is preferably affixed, normally by welding 252, to a first side 254 of the first tubular tow bar 110. Normally, the plug bracket 250 is a thin tab shaped plate. The plug bracket also preferably includes a plurality of receiving notches 260 therein, adapted to receive and securely hold plugs therein.

Figure 19:
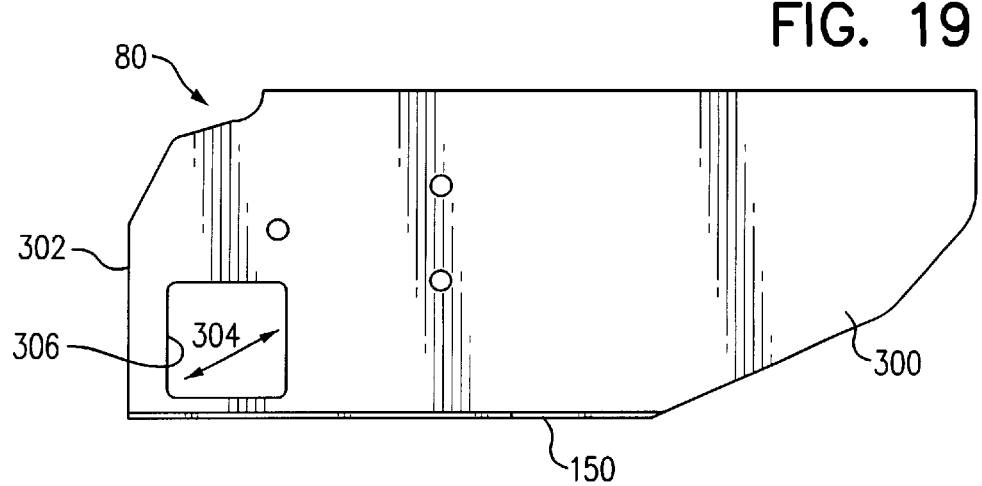
FIG. 19 is a side view of the first embodiment of my frame mount, showing a right side view of the left frame mount.
Figure 20:
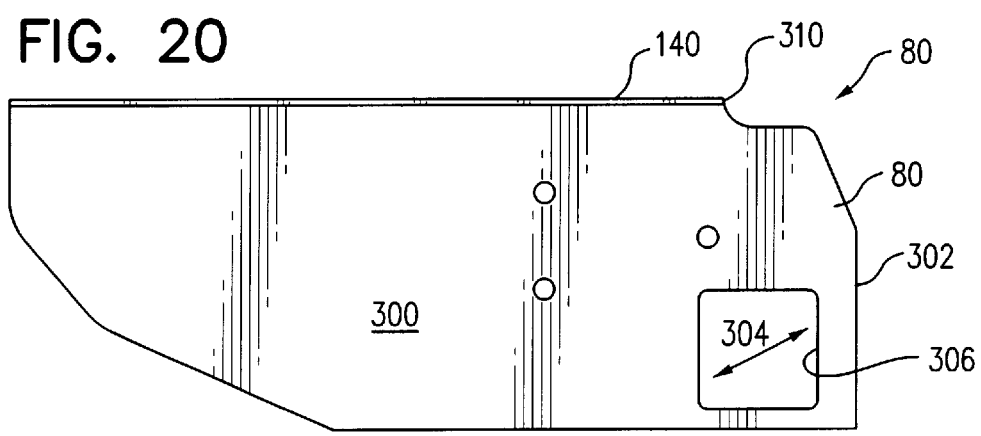
FIG. 20 is a side view of the first embodiment of my frame mount, showing a left side view of the left frame mount.
Figure 21:
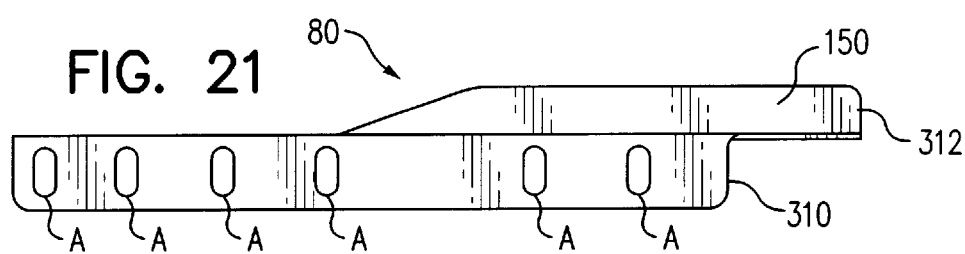
FIG. 21 is a top view of the first embodiment of my frame mount, showing a top view of the left frame mount.
Figure 22:
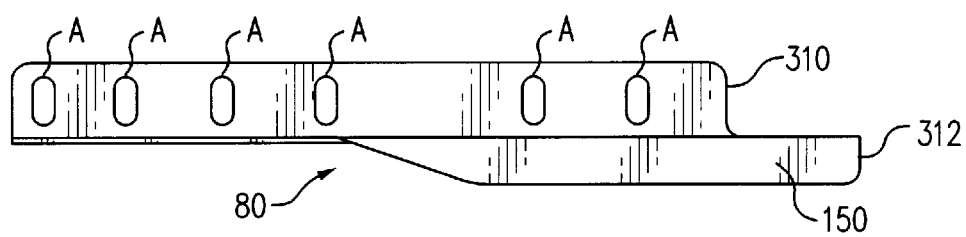
FIG. 22 is a bottom view of the first embodiment of my frame mount, showing a bottom view of the left frame mount.

Turning now to FIGS. 5 and 6, and FIGS. 16 through 22, a first embodiment of my new model opposing frame mounts are shown. The frame mounts 80 and 82 were also illustrated in FIG. 2 as installed in a fully assembled hitch 30. In FIG. 16, a perspective view of my frame mounts 80 and 82 is provided, showing the left 80 and right 82 frame mounts first depicted in FIG. 5 and FIG. 6 above, respectively. Each of the frame mounts 80 and 82 have a vertically oriented main body portion 300. The main body portion has a forward end portion 302. A receiving aperture 304 is defined by a sidewall portion 306, and is sized and shaped to receive and contain therein one end of a selected transverse structural member 34. In FIGS. 17 and 18, and end view of right 82 and left 80 frame mounts are shown, respectively. In FIGS. 19 and 20, right side and left side views, respectively, are provided of a left frame mount 80. In FIGS. 21 and 22, top and bottom views of a left 80 frame mount is shown. The upper mounting flange portion 150 has a forward end 310. The lower strengthening flange portion 150 has a forward end portion 312. For various reasons, including strength, I have found it advantageous to provide the main body portion 300 with a sloping forward portion 320, where the sloping forward portion 320 defines at least a portion of the shape of the said frame mounts 80 or 82 between the upper (140 or 142) mounting flange portion and the lower (150 or 152) strengthening flange portion. Preferably, the sloping forward portion 320 is adapted to allow the lower strengthing flange portion to be shorter than the upper mounting flange portion.

Turning now to FIGS. 7 through 15, a series of drawings illustrate a second embodiment of my frame mounts. Here, first 80' and second 82' frames are provided in a design where the upper flange portions (140' and 142') have a first upper flange portion element 140'-1, and a second upper flange portion element 140'-2, or 142'-1 and 142'-2, as the case may be. The first and second upper flange portions are spaced apart by a main body upper wall portion 330 or 332 (in left or right flange mount, respectively). Preferably, the main body upper wall portion 330 or 332 is provided in an upwardly oriented U-shaped cutout.

In any event, I have found it advantageous to provide pre-drilled mounting aperture cutouts A defined by sidewall portions S, rather than provide flat flanges 350 without cutouts as seen in my prior art hitch shown in FIG. 1. Depending upon the nature of the vehicle frame to which the frame mounts are being affixed, the pre-drilled cutouts may be square shaped apertures, or round shaped apertures, or oval shaped apertures, or ovoid shaped apertures.

It is to be appreciated that the novel trailer hitch provided by the present invention is a significant improvement in the state of the art of towing hitches. My novel hitch designs are relatively simple, and it substantially decreases the cost and complexity involved in affixing a trailer hitch to a towing vehicle.

It is thus clear from the heretofore provided description that my novel trailer hitch designs, which can be easily mounted on a towing vehicle, are an appreciable improvement in the state of the art of devices for trailer hitches. Although only a few exemplary embodiments of this invention have been described in detail, it will be readily apparent to those skilled in the art that the my novel trailer hitches may be modified from those embodiments provided without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, the claims are intended to cover the structures described herein, and not only structural equivalents thereof, but also equivalent structures. Thus, the scope of the invention, as indicated by the appended claims rather than by the foregoing description, is intended to include variations from the embodiments provided which are nevertheless described by the broad meaning and range properly afforded to the language of the claims, or to the equivalents thereof.

What is claimed is:

1. An towing hitch for attachment to the rear of a towing vehicle, said hitch comprising:
  (a) a frame, said frame comprising
    (i) a transversely extending tubular structural member, said structural member extending between a first end and a second end, and having (A) a front, (B) a rear, (C) a bottom, and (D) a top,
    (ii) a first tubular receiving member, said first tubular receiving member having (A) a forward end affixed to said rear of said transversely extending tubular structural member, and (B) extending rearwardly along a central axis to a first mouth portion,
    (iii) a second tubular receiving member, said second tubular hitch receiver mounted below said first tubular receiving member, and having (A) a forward end, and (B) extending rearwardly along a central axis to a second mouth portion, said second tubular receiving member having (A) a bottom portion, and (B) an upper forward portion, wherein said upper forward portion is affixed to said bottom of said transversely extending tubular structural member,
    (iv) a bottom plate, said bottom plate comprising (A) a base portion having an upper surface, and (B) an upwardly extending forward portion, and (C) wherein said upwardly extending forward portion of said bottom plate is affixed to (1) the front of said transverse structural member, and (2) the forward end of said second tubular hitch receiver, and (D) wherein said upper surface of said base portion is joined to said bottom portion of said second tubular hitch receiver;

(v) a pair of opposing frame mounts, one of said frame mounts affixed proximate said first end of said transverse structural member, and one of said frame mounts affixed proximate said second end of said transverse structural member, said frame mounts comprising the sole attachment structure for affixing said hitch to the vehicle;

(b) a first tubular tow bar insert, said first tubular tow bar insert removeably engageable and snugly interfitting for sliding insertion into said first tubular receiving member, said first tubular tow bar insert further comprising (i) a rearwardly extending hitch receiving portion, and (ii) at least two downwardly extending generally U-shaped mounting brackets, and (c) a second tubular tow bar insert, said second tubular tow bar insert removeably engageable and snugly interfitting for sliding insertion into said second tubular receiving member, (d) said downwardly extending mounting brackets laterally straddling said second tubular tow bar insert and securely affixed to said second tubular tow bar insert to join said first and said second tubular inserts as a singular structural member.

2. The hitch as set forth in claim 1, further comprising a pair of stiffening angle gussets, one of said stiffening angle gussets affixed proximate said first end of said transverse structural member between a first one of said frame mounts and said transverse structural member, and a second one of said stiffening angle gussets affixed proximate said second end of said transverse structural member between a second one of said frame mounts and said transverse structural member, so as to strengthen the structure said frame.

3. The hitch as set forth in claim 1, wherein each of said frame mounts further comprises an upper mounting flange portion.

4. The hitch as set forth in claim 3, wherein each of said upper mounting flange portions is outwardly flanged away from said first and said second ends of said transverse structural member.

5. The hitch as set forth in claim 3, or in claim 4, wherein said upper mounting flange portion further comprises a plurality of pre-drilled mounting apertures, each of said plurality of pre-drilled apertures defined by sidewall portions.

6. The hitch as set forth in claim 1, or in claim 3, wherein each of said frame mounts further comprises a lower flange portion.

7. The hitch as set forth in claim 6, wherein each of said lower flange portions extends inwardly from said first and said second ends of said transverse structural member.

8. The hitch as set forth in claim 1, further comprising a first mounting bolt assembly, said first mounting bolt assembly comprising (a) a first nut securely affixed to a first side of said first tubular receiving member, (b) a first locking nut, and (c) a second fastening bolt having a distal end, said fastening bolt adapted for tightening in said first nut until said distal end urges said first tubular tow bar insert toward said first tubular receiving member for frictional engagement therewith, so that said first tubular tow bar is secured to resist movement.

9. The hitch as set forth in claim 1, further comprising a second mounting bolt assembly, said second mounting bolt assembly comprising (a) a second nut securely affixed to a first side of said second tubular receiving member, (b) a second locking nut, and (c) a second fastening bolt having a distal end, said fastening bolt adapted for tightening in said second nut until said distal end urges said second tubular tow bar insert toward said second tubular receiving member for frictional engagement therewith, so that said second tubular tow bar is secured to resist movement.

10. The hitch as set forth in claim 1, further comprising a first generally L-shaped locking pin, and (a) wherein said first tubular receiving member further comprises horizontally spaced apart first and second sidewall apertures, each of said first and second sidewall apertures defined by edgewall portions, and (b) wherein said first tubular tow bar comprises horizontally spaced apart third and fourth sidewall apertures, each of said third and fourth sidewall apertures defined by edgewall portions, and (c) wherein said first, second, third, and fourth sidewall apertures are of comparable size and adapted for receiving said generally L-shaped locking pin in a pre-selected locking location, so as to lock said first tubular tow bar to said first tubular receiving member against forward or rearward movement along the axis of insertion of said first tubular tow bar into said first tubular receiving member.

11. The hitch as set forth in claim 1, further comprising a second generally L-shaped locking pin, and (a) wherein said first tubular tow bar further comprises horizontally spaced apart rearwardly located fifth and sixth sidewall apertures, each of said fifth and sixth sidewall apertures defined by edgewall portions, and (b) wherein a selected hitch insert comprises horizontally spaced apart seventh and eighth sidewall apertures, each of said seventh and eighth sidewall apertures defined by edgewall portions, and (c) wherein said fifth, sixth, seventh, and eighth sidewall apertures are of comparable size and are adapted for receiving said second generally L-shaped locking pin in a pre-selected locking location, wherein said said selected hitch insert is locked to said first tubular tow bar.

12. The hitch as set forth in claim 11, wherein (a) said first or said second generally L-shaped locking pin comprises a cylindrical main body having a longitudinal axis, and wherein said locking pin further comprises a securing pin aperture defined by an interior sidewall, said securing pin aperture oriented transverse said longitudinal of said L-shaped locking pin and extending through said cylindrical main body, and (b) a securing pin is provided, said securing pin adapted for secure engagement in and with said securing pin aperture of said locking pin, so as to secure said locking pin against disengagement from said pre-selected locking location.

13. The hitch as set forth in claim 1, further comprising an upper reinforcing bar, said upper reinforcing bar generally in an elongated, flat, parallelepiped shape extending between said top side of said transverse structural member and said upper side of said first tubular receiving member, so as to strengthen the joint therebetween.

14. The hitch as set forth in claim 1, further comprising an upper chain attachment plate, said chain attachment having an elongated main body with spaced apart chain receiving apertures defined by vertically oriented sidewall portions, said chain receiving apertures spread laterally beyond said first tubular tow bar.

15. The hitch as set forth in claim 1, further comprising a plug bracket, said plug bracket affixed to a first side of said said first tubular tow bar, said plug bracket comprising thin tab shaped plate.

16. The hitch as set forth in claim 15, wherein said plug bracket further comprises a plurality of receiving notches therein.

* * * * *